US006832403B2

United States Patent
Hahn et al.

(10) Patent No.: US 6,832,403 B2
(45) Date of Patent: Dec. 21, 2004

(54) MOVEABLE BUMPER FOR A DOCK LEVELER

(75) Inventors: Norbert Hahn, Franklin, WI (US); Michael A. Swessel, Menomonee Falls, WI (US); Edward A. Raleigh, Waunakee, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 10/634,703

(22) Filed: Aug. 5, 2003

(65) Prior Publication Data

US 2004/0025267 A1 Feb. 12, 2004

Related U.S. Application Data

(63) Continuation of application No. 09/850,430, filed on May 7, 2001, now Pat. No. 6,634,049.

(51) Int. Cl.[7] .................................................. E01D 1/00
(52) U.S. Cl. ........................... 14/69.5; 14/71.1; 14/71.3
(58) Field of Search .................................. 14/69.5, 71.1

(56) References Cited

U.S. PATENT DOCUMENTS

| 3,203,002 A | 8/1965 | McGuire |
| 3,375,625 A | 4/1968 | Edkins et al. |
| 3,440,673 A | 4/1969 | Kelley |
| 3,493,984 A | 2/1970 | Reinhard |
| 3,570,033 A | 3/1971 | Hovestad et al. |
| 3,644,952 A | 2/1972 | Hatch |
| 3,665,997 A | 5/1972 | Smith et al. |
| 3,840,930 A | 10/1974 | Wanddell |
| 3,921,241 A | 11/1975 | Smith |
| 4,420,849 A | 12/1983 | Alten |
| 4,682,382 A | 7/1987 | Bennett |
| 4,744,121 A | 5/1988 | Swessel et al. |
| 5,088,143 A | 2/1992 | Alexander |
| 5,450,643 A | 9/1995 | Warner |

(List continued on next page.)

FOREIGN PATENT DOCUMENTS

| CH | 685117 A5 | 3/1995 |
| DE | 2800128 | 5/1979 |

(List continued on next page.)

OTHER PUBLICATIONS

International Search Report concerning International Application Ser. No. PCT/US99/14867, European Patent Office, dated Mar. 11, 1999, 8 pages.

(List continued on next page.)

Primary Examiner—Robert E. Pezzuto
Assistant Examiner—Raymond W. Addie
(74) Attorney, Agent, or Firm—Marshall, Gerstein & Borun LLP

(57) ABSTRACT

A dock leveler system includes a pivotal deck whose movement provides the impetus for moving a bumper between an operative position and a retracted position. The bumper is movable relative to the deck, so that after a truck bumps up against the bumper, the bumper can move below the deck to avoid creating an obstacle to a forklift or the like traveling on the deck. The moveable bumper can be disposed within the width of a dock leveler deck that encompasses the full-width of a truck bed. Of the various embodiments, some bumpers pivot underneath the deck, and others move straight up and down. In the operative position, some bumpers are flush with the top of the deck, and others protrude above the deck.

11 Claims, 17 Drawing Sheets

U.S. PATENT DOCUMENTS

| | | | |
|---|---|---|---|
| 5,452,489 | A | 9/1995 | Gelder et al. |
| 5,644,812 | A | 7/1997 | Neufeldt et al. |
| 5,651,155 | A | 7/1997 | Hodges et al. |
| 5,658,633 | A | 8/1997 | Di Biase |
| 5,775,044 | A | 7/1998 | Styba et al. |
| 5,832,554 | A | 11/1998 | Alexander |
| 5,881,414 | A | 3/1999 | Alexander |
| 5,996,291 | A | 12/1999 | Styba et al. |
| 6,006,389 | A | 12/1999 | Alexander |
| 6,070,283 | A | 6/2000 | Hahn |
| 6,360,394 | B1 | 3/2002 | Hahn |

FOREIGN PATENT DOCUMENTS

| | | |
|---|---|---|
| DE | 29600207 U1 | 8/1996 |
| DE | 19612135 A1 | 2/1997 |
| DE | 29716877 U1 | 2/1998 |
| DE | 29804117 U1 | 5/1998 |
| EP | 0040388 | 11/1981 |
| FR | 2686913 | 8/1993 |
| GB | 1161537 | 8/1969 |

OTHER PUBLICATIONS

Drawing "Adjustable Bottom Pad (692–0029)", dated Oct. 17, 1985, showing a vertically adjustable pad mounted to the dock face.

Spec Sheet "Loading Systems Mobile Dock Bumper RB 250M", dated circa 1993, showing a vertically–adjustable spring–loaded dock bumper.

Hafa GmbH Technical Drawing, "Hühenbeweglicher Anfahrpuffer" dated Nov. 1995, 1 page.

Technical Memorandum regarding Height–Adjustable Collision Bumpers (English Translation) Nov. 13, 1995.

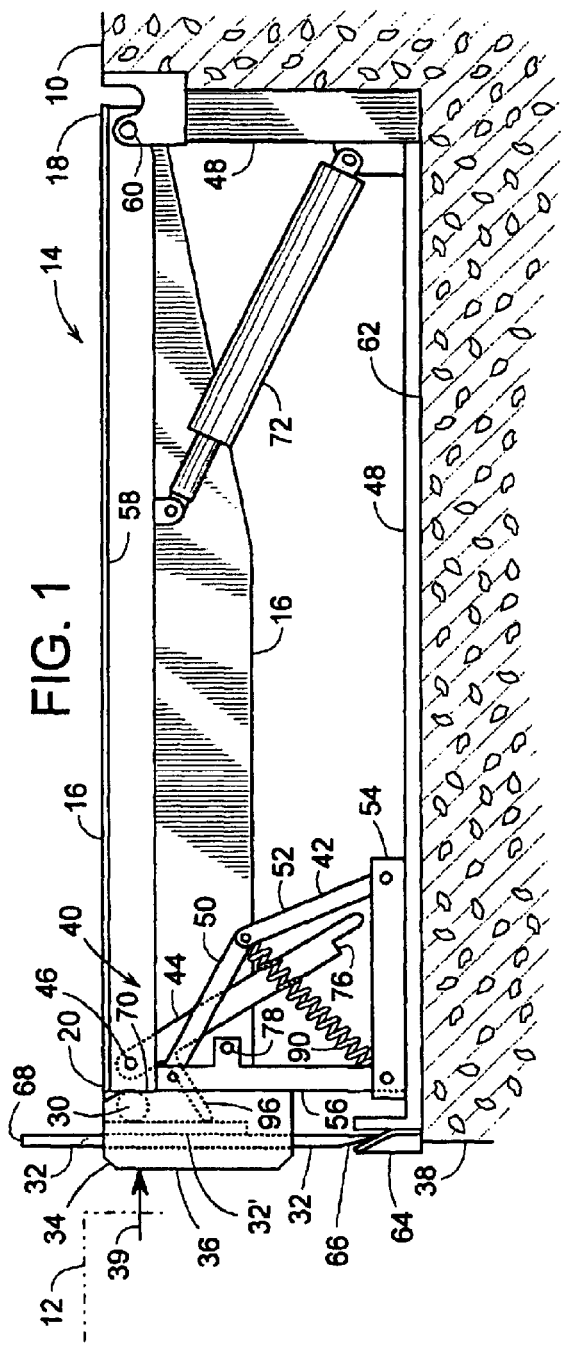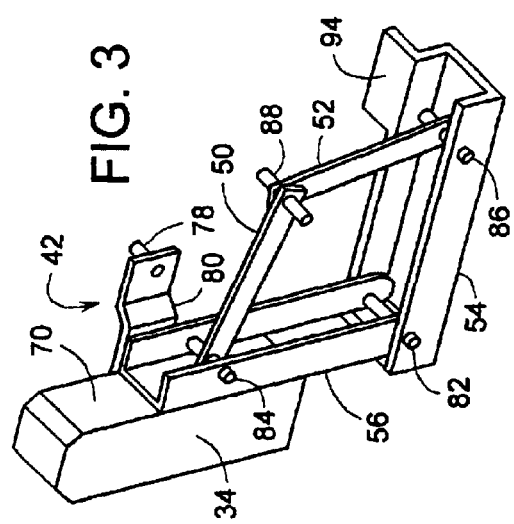

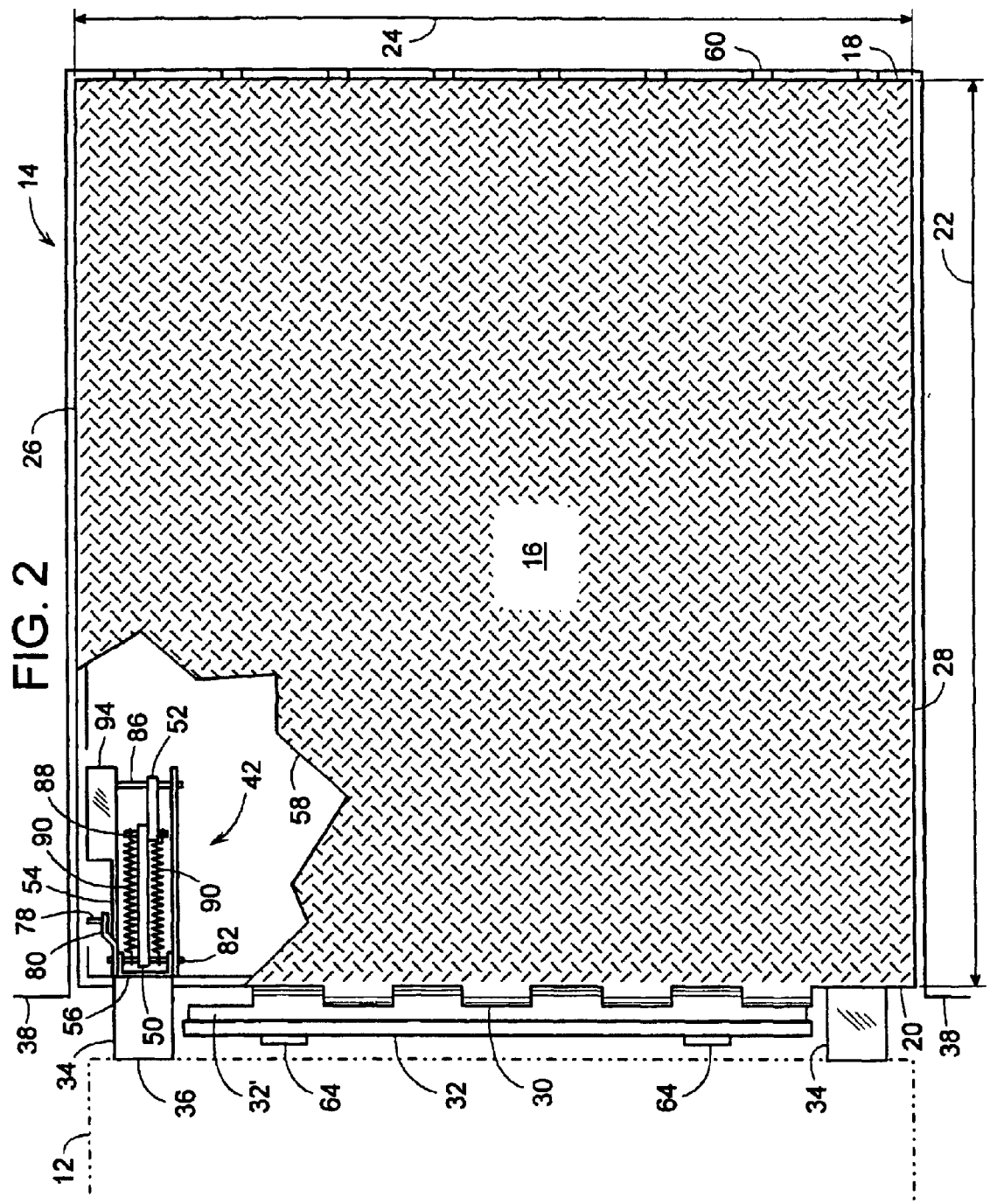

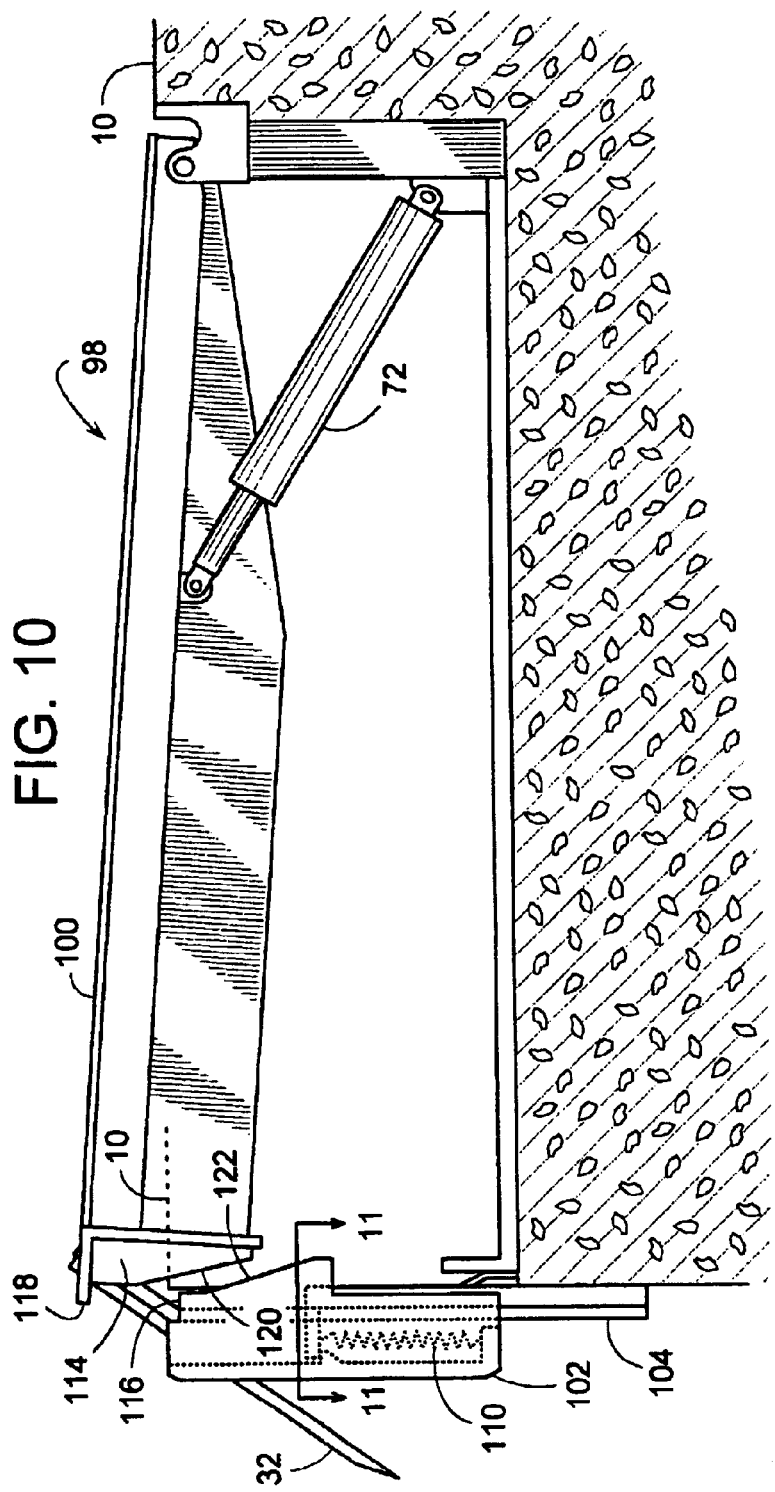
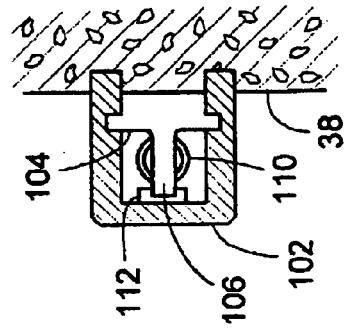

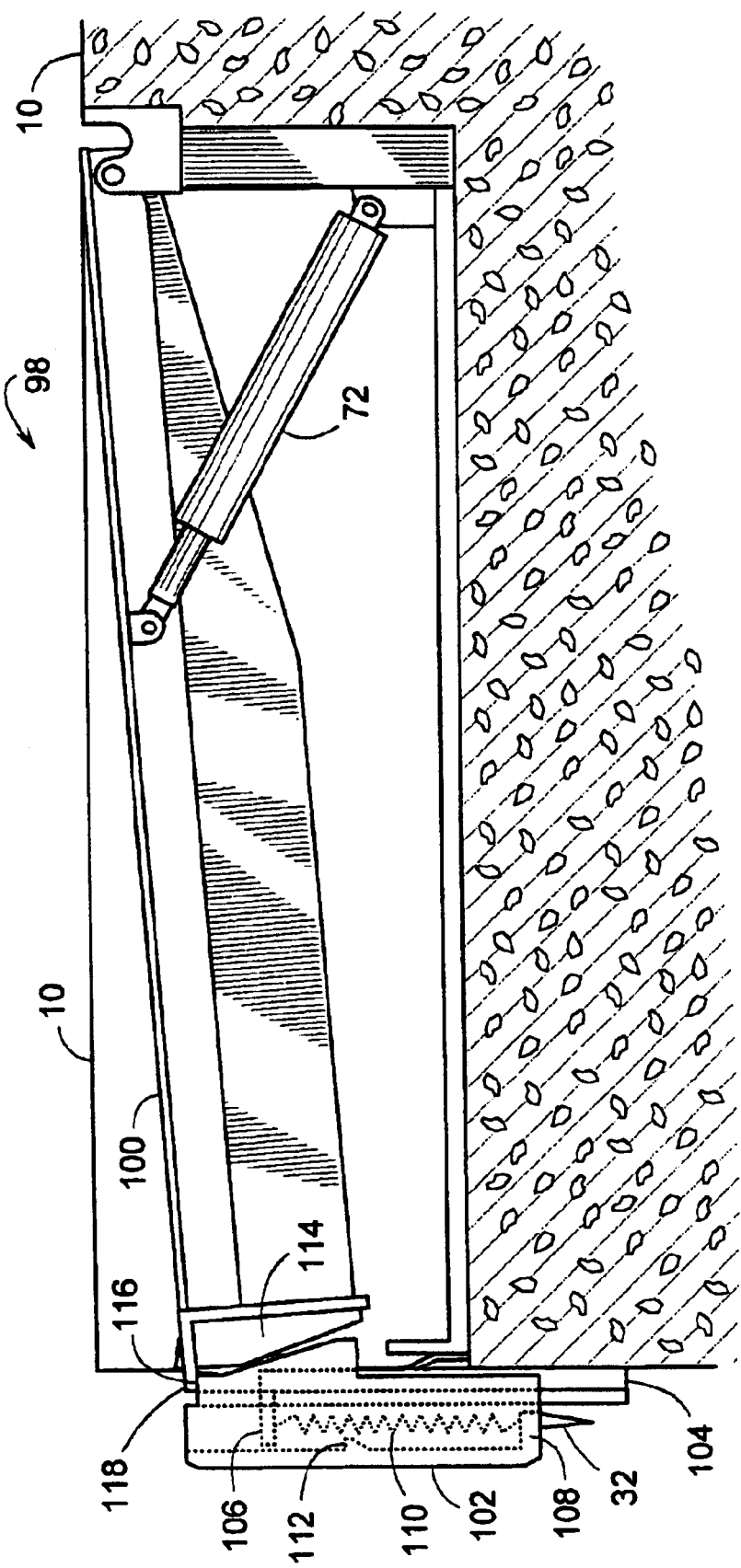

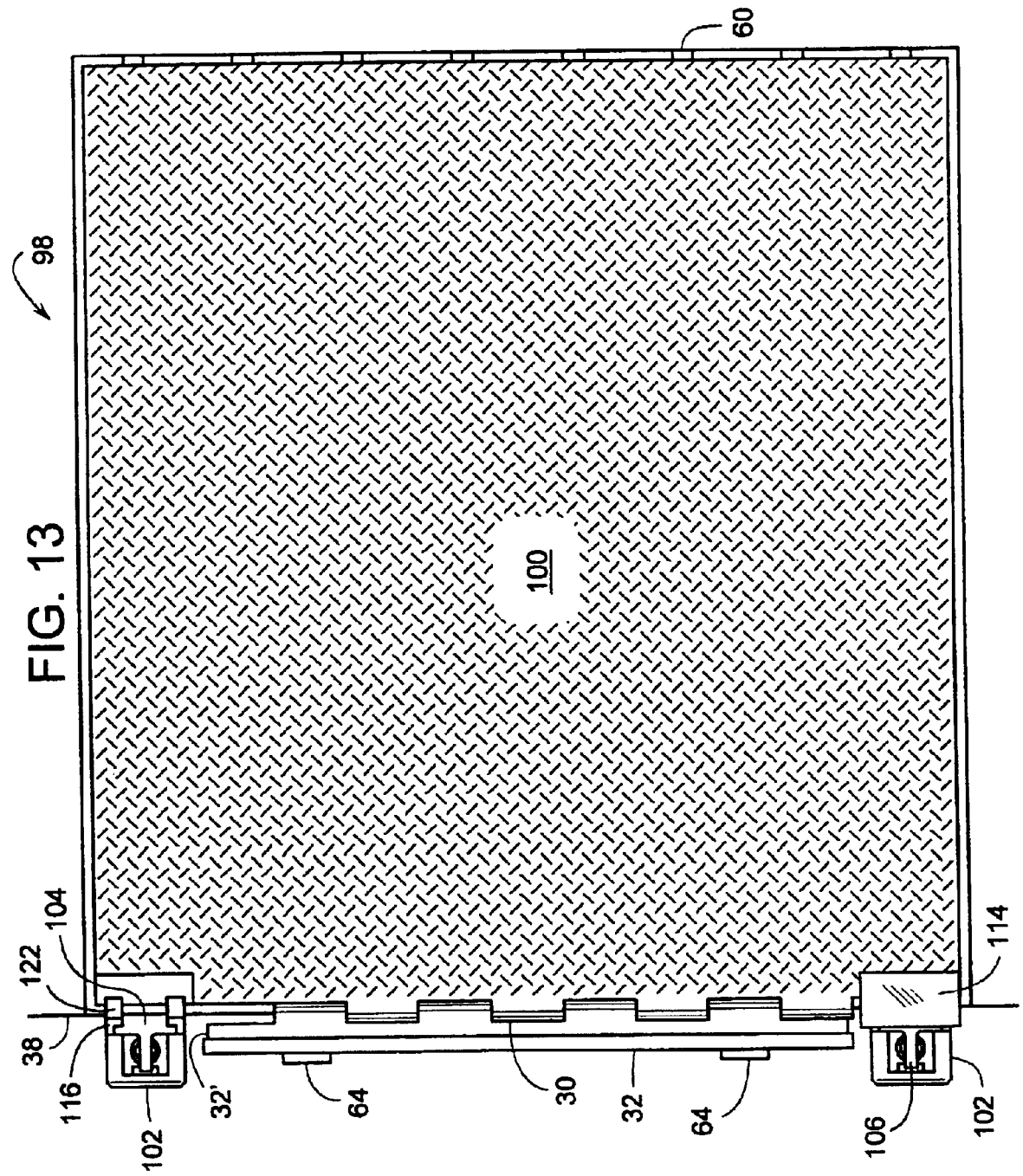

MOVEABLE BUMPER FOR A DOCK LEVELER

This is a continuation of Ser. No. 09/850,430 filed on May 7, 2001 now U.S. Pat. No. 6,634,049.

BACKGROUND OF THE INVENTION

1. Field of the Invention

The subject invention generally pertains to dock leveler system and more specifically to a bumper that moves in response to movement of a dock leveler deck.

2. Description of Related Art

Dock levelers are often used to compensate for a height difference that may exist between a loading dock platform and the bed of a truck parked at the dock. A dock leveler system typically includes a ramp or deck that is hinged at its back edge to raise or lower its distal front edge to generally match the height of the truck bed. Often an extension plate or lip is pivotally coupled to the ramp to bridge the gap between the ramp's front edge and a back edge of the truck bed. The ramp and extended lip provide a path for forklift trucks to travel from the loading dock platform and onto the truck bed, thus facilitating loading or unloading the truck.

When a truck backs into the dock, bumpers mounted adjacent the dock leveler are often used to help prevent the rear of the trailer bed from damaging itself or the dock. There are usually two spaced-apart bumpers mounted to the front face of the dock with one on either side of the dock leveler. This allows the lip and pivoting deck to operate within the span between the two bumpers. To prevent a truck from backing up between the two bumpers and striking the dock leveler, the bumpers are usually spaced apart at something less than the full width of a standard size truck. Thus, for dock levelers that operate between such bumpers, the widths of the deck and lip need to be significantly less than that of a standard truck. Unfortunately, in below-dock operation, a relatively narrow deck may limit a forklift's access to the right and left rear portion of the truck bed, as explained in U.S. Pat. No. 6,070,283.

However, providing an extra wide deck that extends the full width of a standard-width truck may place the bumpers too far apart to effectively engage trucks that are relatively narrow or are off-center to the bumpers. If the bumpers are installed below the front edge of a full-width deck, the bumpers may prevent the deck from descending below the dock platform for "below-dock" operation. Operating below-dock is a common practice when servicing trucks whose bed is lower than the dock platform.

To avoid a bumper/deck interference problem with below-dock operation, moveable bumpers can be used, such as those disclosed in U.S. Pat. No. 4,420,849 and European Patent 0 040 388. Both references show bumpers that can retract by swinging underneath the deck from their operative position to a stored position. However, the movement of the bumpers is provided by what appears to be hydraulic cylinders. Such cylinders, when dedicated to operating just the bumpers, add substantial cost to a dock leveler system. The cost includes the initial cost plus ongoing maintenance of the cylinders, as well as their related valves, hydraulic lines and controls.

U.S. Pat. No. 5,881,414 shows another example of a bumper whose movement is provided by a dedicated powered cylinder. However, the deck (item 11) is less than the full width of the dock leveler pit, as deck 11 is situated between the independent bumper support beams (item 20). Also, a height differential between deck 11 and beams 20 can create a step along either side edge of deck 11, as shown in the patent's FIG. 4. Such a step could be a tipping hazard for a forklift and may pose other operational difficulties.

SUMMARY OF THE INVENTION

To provide full access to the right and left rear portions of a truck bed, a dock leveler system includes a deck with a moveable bumper that lies within the width of the deck. The bumper is able to move out of the way to avoid interfering with the operation of the deck and to avoid creating an obstacle to a forklift or the like traveling on the deck. The deck engages the bumper, so that the movement of the deck is what moves the bumper, thereby eliminating the need for a separately powered bumper actuator.

In some embodiments, a pivotal deck moves the bumper in one direction, while a spring urges the bumper in an opposite direction.

In some embodiments, the bumper moves linearly.

In some embodiments, the bumper pivots.

In some embodiments, the bumper moves from an operative position facing the rear of a truck parked at the dock to a retracted position underneath the deck.

In some embodiments, the bumper and deck are coupled to each other by way of a mechanism that has an active mode and a disabled mode, such that downward movement of the deck forces the bumper down when in the active mode; however, in the disabled mode the bumper remains substantially stationary as the deck descends to a cross-traffic position.

BRIEF DESCRIPTION OF THE DRAWINGS

FIG. 1 is a side view of one embodiment of a dock leveler system with its deck in a cross-traffic position and its bumper in an operative position.

FIG. 2 is a top view of the dock leveler system of FIG. 1 with a right-front portion of the deck cut away to show features of a mechanism that connects to a bumper.

FIG. 3 is a perspective view of a bumper and a four-bar linkage used in the dock leveler system of FIG. 1, but with the springs of the linkage removed to more clearly illustrate other features of the linkage.

FIG. 10 is the same as FIG. 9, but with the deck partially raised and the lip partially extended.

FIG. 11 is a cross-sectional view of a bumper taken along line 11—11 of FIG. 10.

FIG. 12 is the same as FIG. 9, but with the deck in a below-dock position, the bumper in a retracted position, and the lip hanging generally pendant.

FIG. 13 is a top view of the dock leveler system of FIG. 9 with a right-front block of the deck removed to show features of the bumper.

DESCRIPTION OF THE PREFERRED EMBODIMENT

Figure 4:
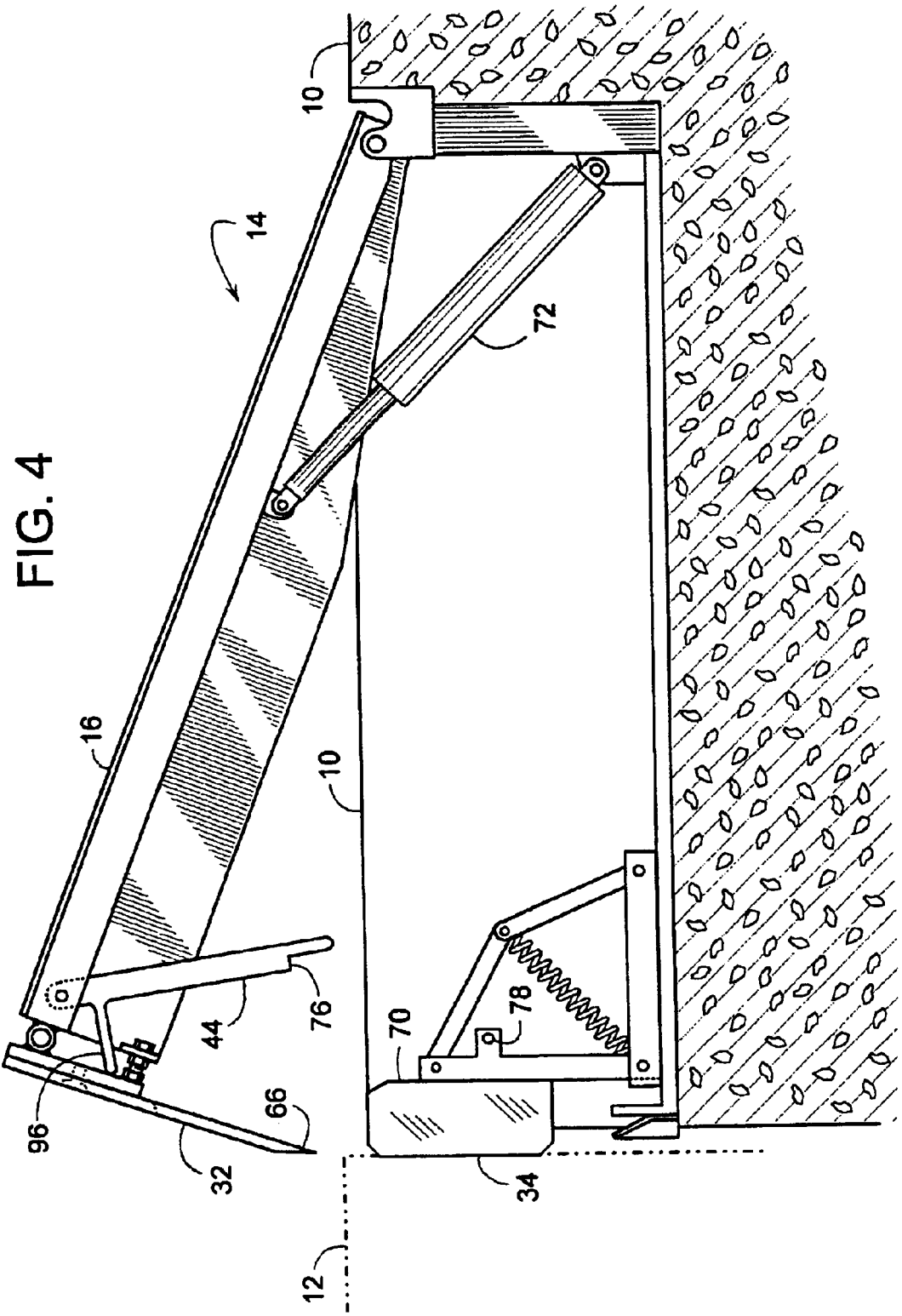
FIG. 4 is the same as FIG. 1, but with the deck raised, lip pendant and a mechanism of the dock leveler system in a disabled mode.

Referring to FIGS. 1 and 2, in order to compensate for a height difference that may exist between a loading dock platform 10 and a truck bed 12, a dock leveler 14 includes a ramp or deck 16 that is hinged along its rear pivotal edge 18 to raise or lower its front distal edge 20 to generally match the height of truck bed 12. Referring to FIG. 2, deck 16 has a length 22 extending between edges 18 and 20, and has a width 24 extending between a right edge 26 and a left edge 28. A hinge 30 pivotally couples an extension plate or lip 32 to deck 16, so that lip 32 can swing out and rest upon the rear edge of truck bed 12, thus bridging the gap between the deck's front edge 20 and the rear of truck bed 12. Together, deck 16 and extended lip 32 provide a path for a forklift truck and personnel to travel between platform 10 and truck bed 12, thus facilitating the loading and unloading of the truck.

To help protect the rear of the truck or the dock from impact when a truck backs into the dock, preferably two bumpers 34 are installed along either side of dock leveler lip 32. Each bumper 34 has an abutment surface 36 that typically protrudes beyond a face 38 of the dock. Bumpers 34 are spaced apart to provide enough room for lip 32 to operate between the two while being sufficiently close to prevent the rear of the truck from contacting the building and/or the dock leveler lip.

The actual structure used to mount bumpers 34 can vary, but preferably the mounting structure is such that it enables the pivotal movement of the deck to provide the impetus that moves bumpers 34 between an operative position and a retracted position. In the operative position, abutment surface 36 of each bumper 34 is in a position to absorb or receive an impact 39 from an incoming truck. In the retracted position, bumpers 34 are beneath the deck structure to provide a clear path for traffic across the top surface of deck 16, even when deck 16 is in a below-dock position, i.e., front edge 20 is below floor level of dock platform 10.

In one embodiment, the structure used in mounting and operating bumpers 34 includes a mechanism 40 that comprises a four-bar linkage 42 plus an operator 44, as shown in FIGS. 1–3. However, it should be noted that mechanism 40 is just one example of a mechanism that allows the movement of deck 16 to reposition bumper 34 between an operative position and a retracted position. Other mechanism for performing the general function of mechanism 40 would include, but not be limited to mechanisms employing cables, ropes, chains, gears, sprockets, pulleys, etc. Nonetheless, for some embodiments, operator 44 is pivotally connected to deck 16 by way of a pin 46, while four-bar linkage 42 may be attached to a frame 48 of dock leveler 14 and/or pit floor 62. The four bars of linkage 42 comprise a first link 50, a second link 52, a base 54, and a bumper support arm 56 to which bumper 34 is attached. Each bumper 34 is preferably associated with its own mechanism 40. The function of each mechanism 40 is best understood with reference to the overall operation of dock leveler system 14 and will be explained with reference to just one side of leveler 14, i.e., one bumper 34 and its associated mechanism 40, as both mechanisms 40 operate in the same manner.

The operation begins with deck 16 in a cross-traffic position (i.e., the top of deck 16 is generally flush with the floor of platform 10), as shown in FIG. 1. The term, "deck" encompasses an upper traffic surface or a top plate 58 and any related support or supplemental structure such as those items known as support beams, girders, stringers, end plates, side plates, braces, gussets, tabs, lugs, etc. A rear hinge 60 pivotally couples deck 16 to frame 48, which is installed within a dock leveler pit 62. In FIG. 1, lip 32 is shown in its pendant position with preferably two lip keepers 64 supporting a tip 66 of lip 32. Although various well-known, conventional lip designs can be used, in this embodiment lip 32 is mounted for limited sliding motion relative to a lip support plate 32', which in turn is pivotally connected to deck 16 by way of hinge 30. The sliding connection allows one edge 68 of lip 32 to protrude above deck 16 to provide a barricade that helps prevent a forklift from accidentally rolling off the edge of deck 10 when a truck is not present while dock leveler 14 is in its stored position. Further details of one embodiment of lip 32 are disclosed in U.S. Pat. No. 4,920,598, which is specifically incorporated by reference herein. At the initial stage of operation, four-bar linkage 42 places its corresponding bumper 34 in its operative position, as shown in FIGS. 1–3. To withstand the impact of a truck backing up against the face 36 of bumper 34, much of the impact can be transmitted to deck 16, frame 48 and the surrounding concrete of pit 62 by providing bumper 34 with an engagement surface 70 that is adapted to engage deck 16.

Figure 5:
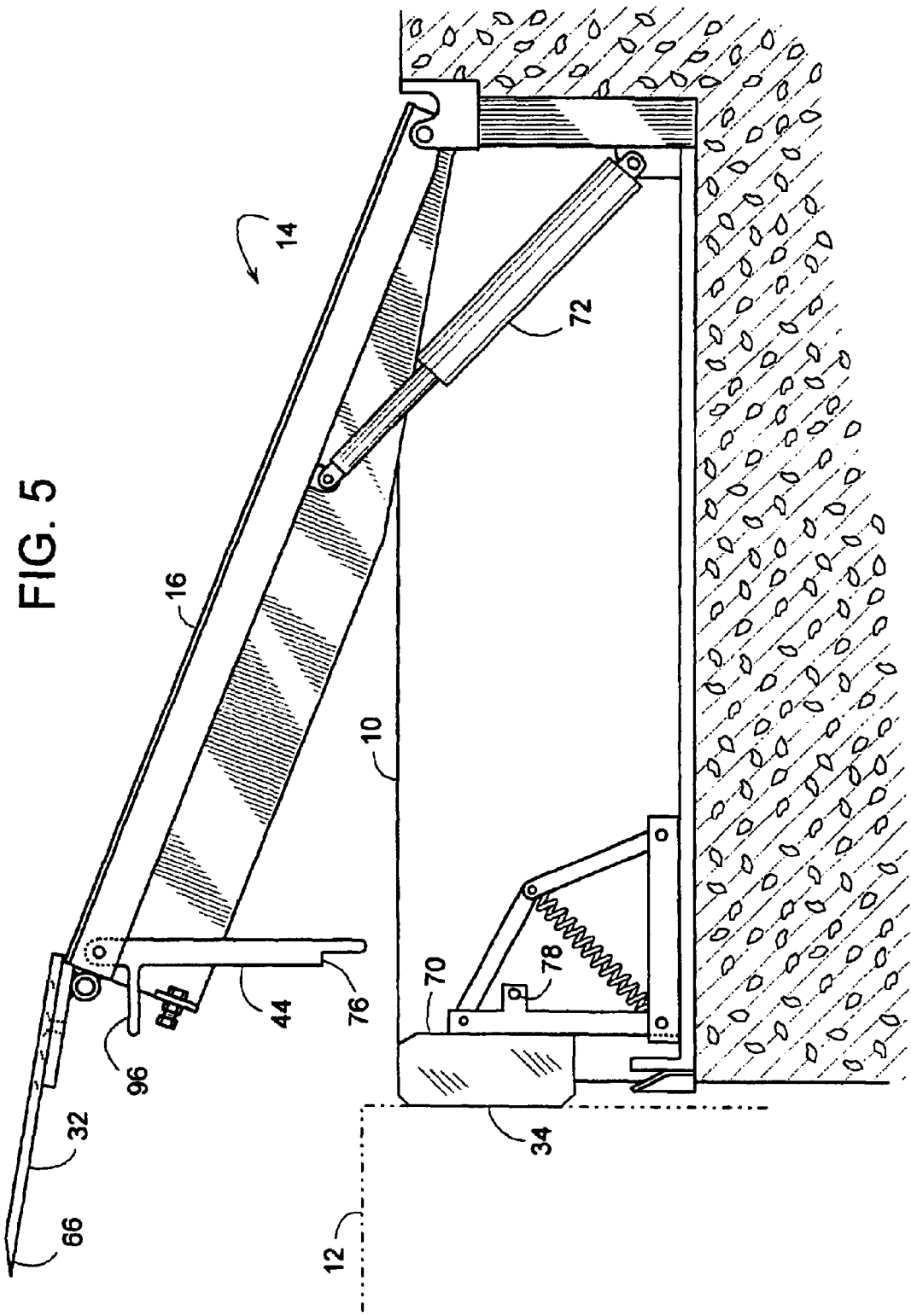
FIG. 5 is the same as FIG. 4, but with a lip extended and the dock leveler system mechanism in an active mode.

After the truck bumps up against bumper 34 and stops at the desired position, bumper 34 can be moved out of the way so as not to interfere with the loading or unloading of the truck. Before moving bumper 34, an actuator, e.g., a hydraulic cylinder 72, first lifts deck 16 to raise tip 66 of lip 32 above truck bed 12, as shown in FIG. 4. This disengages surface 70 from deck 16 and allows lip 32 to be extended out and over truck bed 12 without striking the rear of bed 12, as shown in FIG. 5. The lip actuator for extending lip 32 is not shown, as doing so would detract from other illustrated features of mechanism 40. However, the lip actuator could be any one of those widely used today, such as a conventional hydraulic cylinder.

With deck 16 raised and lip 32 extended, operator 44 is able to swing forward, as lip 32 disengages an extension 96 that protrudes from operator 44. This places mechanism 40 in an active mode, wherein downward movement of deck 16 moves bumper 34 to its retracted position. It should be appreciated by those skilled in the art that instead of extension 96 protruding from operator 44 another member equivalent in function to extension 96 could extend from underneath lip 32 and engage operator 44 as lip 32 pivots downward. However, extension 96 protruding from operator 44 is the currently preferred embodiment.

Figure 6:
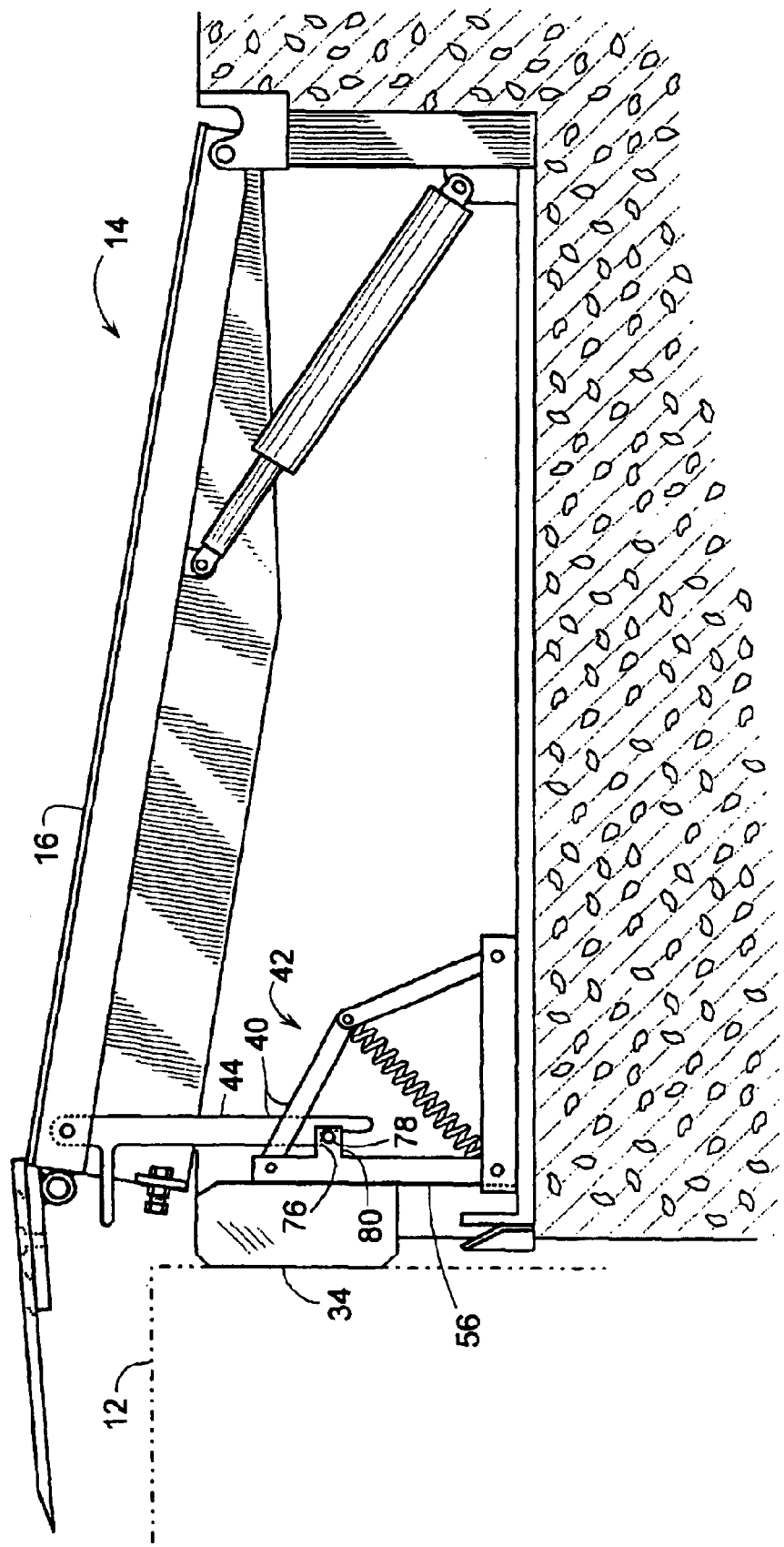
FIG. 6 is the same as FIG. 5, but with the deck lowered and the lip extended to place a mechanism of the dock leveler system in a bumper retraction position.
Figure 7:
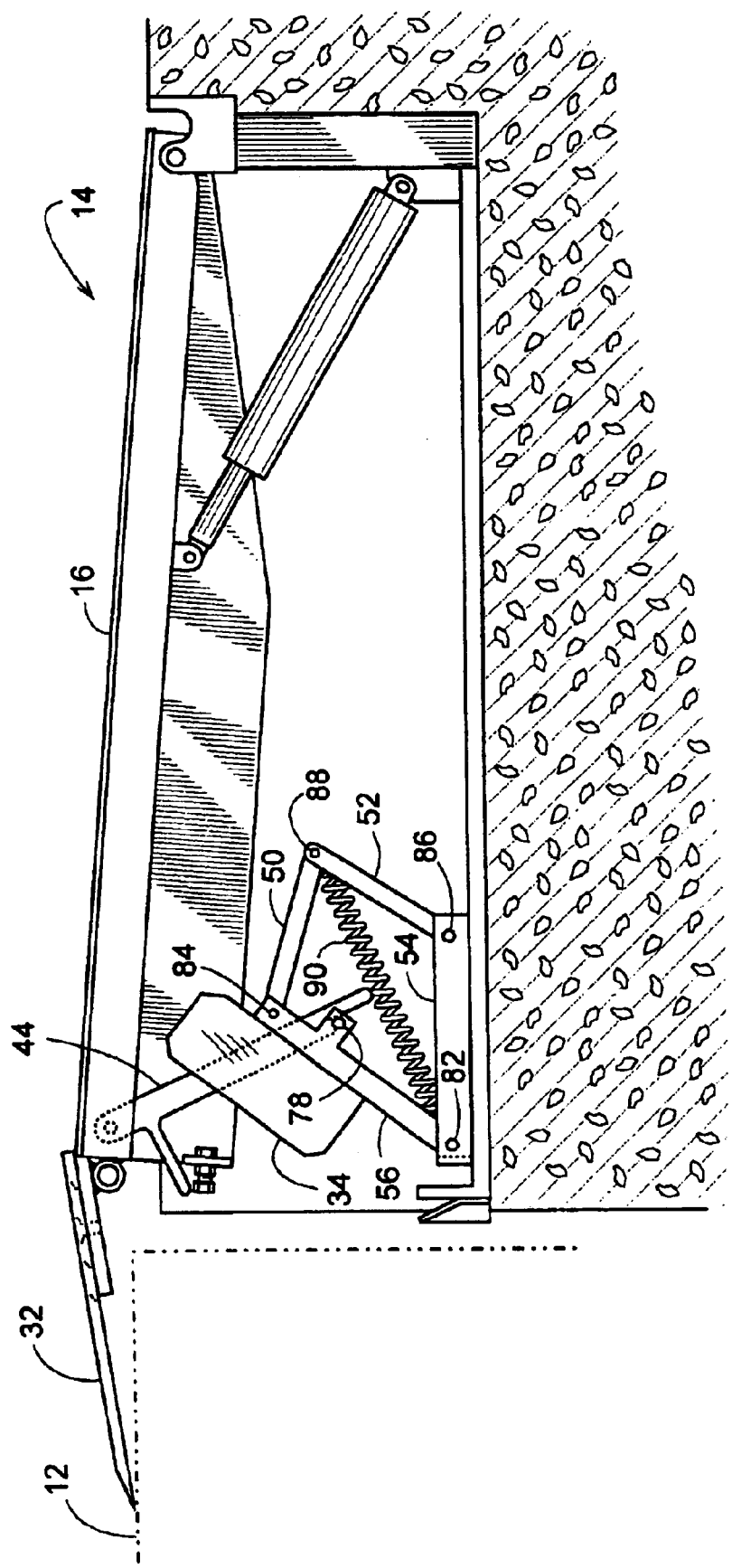
FIG. 7 is the same as FIG. 6, but with the deck lowered further to move the bumper below the deck.
Figure 8:
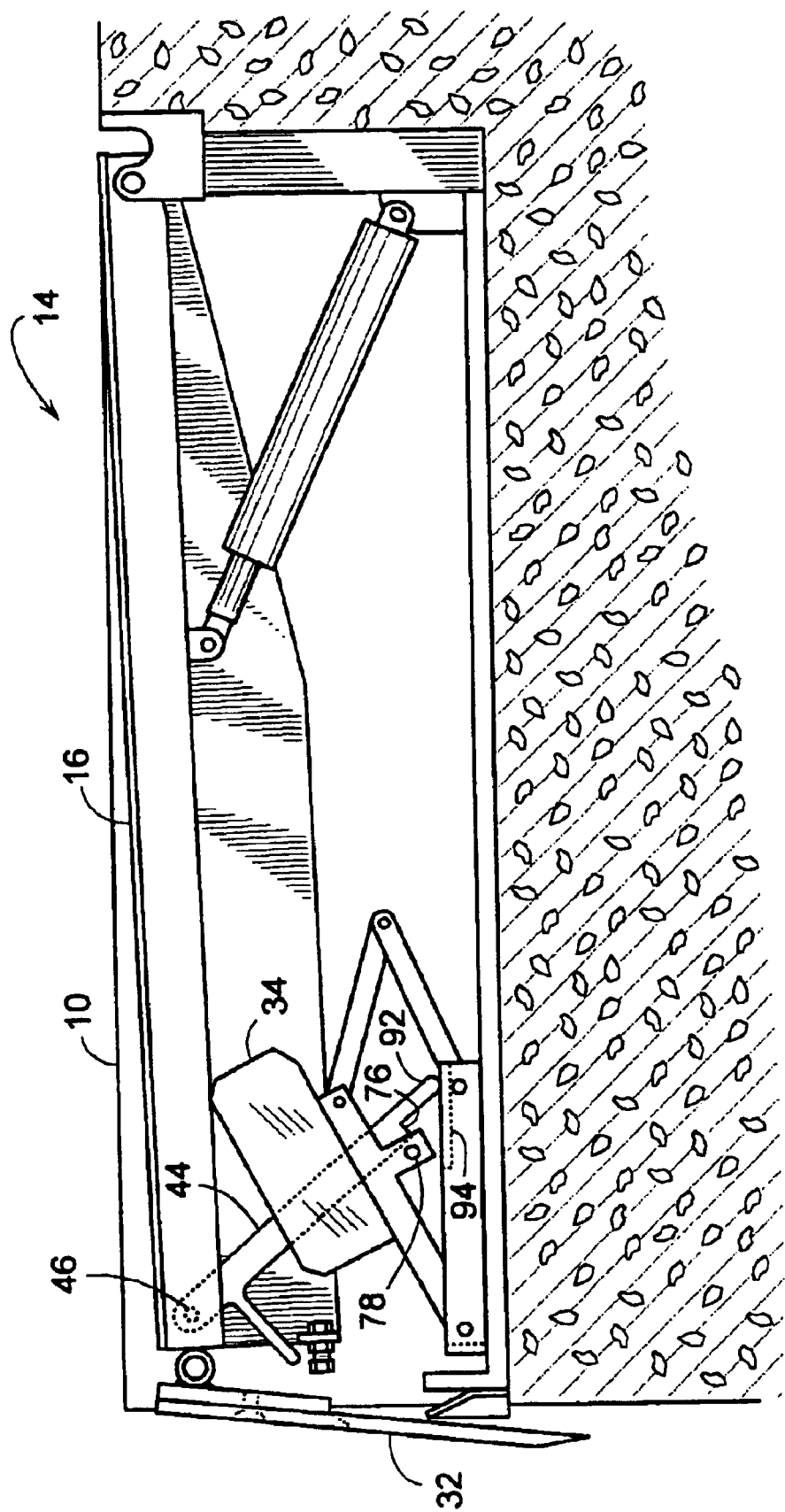
FIG. 8 is another side view of the dock leveler system of FIG. 1, but with the deck in a partially below-dock position, the bumper in a retracted position, and the lip hanging generally pendant.

To move bumper 34 to its retracted position (where it remains below the upper surface of the deck), deck 16 first descends from its position of FIG. 5 to that of FIG. 6. This engages an edge 76 of operator 44 with a protrusion 78 of four-bar linkage 42. A lug 80 rigidly extending from bumper support arm 56 fixes protrusion 78 relative to bumper 34, so moving protrusion 78 moves bumper 34. From the position of FIG. 6, further downward movement of deck 16 lowers lip 32 upon truck bed 12 to facilitate the loading and/or unloading of the truck, as shown in FIG. 7. However, the downward deck movement also provides the impetus that causes operator 44 to push against protrusion 78, which in turn pivots bumper support arm 56 about a pin 82 that pivotally couples arm 56 to base 54. At the same time, a pin 84 provides relative rotation between first link 50 and arm 56, a pin 86 provides relative rotation between second link 52 and base 54, and a pin 88 provides relative rotation between links 50 and 52

The relative movement of arm 56, base 54, and links 50 and 52 creates unlimited opportunities to provide four-bar linkage 42 with a spring-return action. The spring-return can be provided by springs of almost any style including, but not limited to, a tension spring, compression spring, torsion spring, and gas spring. Other mechanisms for returning bumper 34 to its operative position are also well within the scope of the invention. For the embodiment of FIGS. 1–8, one or more tensions springs 90 connect pins 82 and 88 to urge bumper 34 to its operative position. For clarity, springs 90 are not shown in FIG. 3; however, in some installations, two tension springs 90 connect pin 82 to pin 88 with one spring 90 on each protruding end of pin 88, as shown in FIG. 2. In other embodiments, a single spring provides tension between pins 82 and 88.

Figure 19:
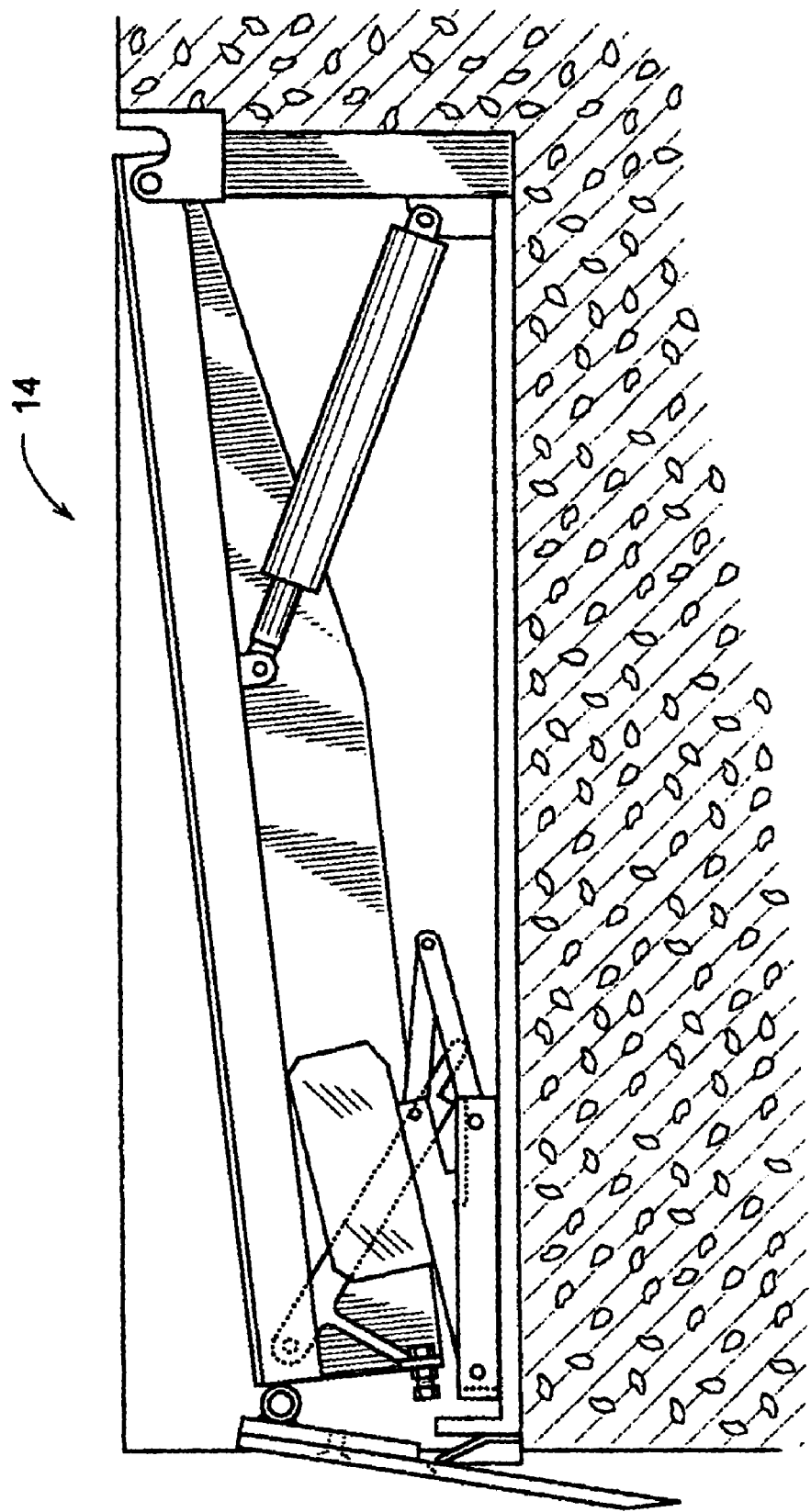
FIG. 19 is similar to FIG. 8, but with the deck at its maximum below dock position.

After completing the loading or unloading of cargo from truck bed 12, dock leveler 14 is commonly returned to its stored or cross-traffic position of FIG. 1. To return leveler 14 and bumpers 34 to their original positions of FIG. 1 without having to first raise deck 16 all the way back up to its position of FIG. 4, edge 76 of operator 44 is first disengaged from protrusion 78. To do this, deck 16 and lip 32 are allowed to descend to the below-dock position shown in FIG. 8. Upon deck 16 lowering to this predetermined position (or even lower, as shown in FIG. 19), a tip 92 (or some other portion of operator 44) engages a release surface, such as plate 94, base 54, frame 48, pit 62 or some other structure associated with the system of leveler 14. This forces edge 76 to disengage protrusion 78 by plate 94 effectively rotating operator 44 counterclockwise (as viewed in FIG. 8) about pin 46. With edge 76 disengaged from protrusion 78, deck 16 only needs to rise just high enough for bumper 34 to spring back out from underneath deck 16. Once bumper 34 returns to its operative position, deck 16 can lower once again to its stored, cross-traffic position of FIG. 1.

It should be appreciated by those skilled in the art that leveler system 14 in the position of FIG. 19 can also be useful in certain below-dock situations. For example, it may be desirable to add or remove a load at the very rear of truck bed 12 without using lip 32. Otherwise, if lip 32 were fully extended and resting on truck bed 12, lip 32 might be resting at the very location where the load needs to be added or removed.

To prevent bumper 34 from moving to its retracted position while attempting to lower deck 16 from its raised position of FIG. 4 to its stored position of FIG. 1, operator 44 can be provided with an extension 96 that lip 32 or its plate 32' can selectively engage. When lip 32 is generally pendant, as shown in FIG. 4, lip 32 pushes against extension 96 to tilt operator 44, so that edge 76 clears protrusion 78 when deck 16 descends. However, when lip 32 extends, as shown in FIG. 5, lip 32 disengages extension 96 to allow operator 44 to swing its edge 76 into alignment with protrusion 78 as deck 16 descends. Thus, lip 32 disengaging extension 96 places mechanism 40 in an active mode, wherein downward movement of deck 16 can move bumper 34 to its retracted position. Alternately, lip 32 engaging extension 96 places mechanism 40 in a disabled mode, which permits downward movement of deck 16 while bumper 34 remains at its operative position.

In another embodiment, shown in FIGS. 9–13, a dock leveler system 98 uses pivotal movement of a deck 100 to move a bumper 102 generally linearly between an operative position (FIGS. 9 and 10) and a retracted position (FIG. 12). Although leveler 98 preferably includes two bumpers, the structure and function of the bumpers will be described with reference to just one, as both bumpers are identical or very similar.

To render bumper 102 moveable between its operative and retracted positions, bumper 102 is mounted for vertical movement to a track 104 that is attached to face 38 of the dock. To urge bumper 102 upward to its operative position, a bar 106 extends from an upper end of track 104, and another bar 108 extends from a lower end of bumper 102 with a tension spring 110 connecting the two bars 106 and 108. However, instead of spring 110, it is well within the scope of the invention to move bumper 102 upward using another device, such a compression spring, gas spring, counter weight, etc. A stop 112 on bumper 102 engages bar 106 to limit the upward travel of bumper 102.

To allow the downward movement of deck 100 to lower bumper 102 to its retracted position, deck 100 includes an angled block 114 that moves with the rest of deck 100 and can selectively engage an engagement surface 116 of bumper 102. In a preferred embodiment, block 114 includes an upper lip 118 that overlays surface 116 of bumper 102. Thus, as deck 100 pivots downward, lip 118 pushes against surface 116 to move bumper 102 from its operative position of FIG. 9 to its retracted position of FIG. 12.

Figure 9:
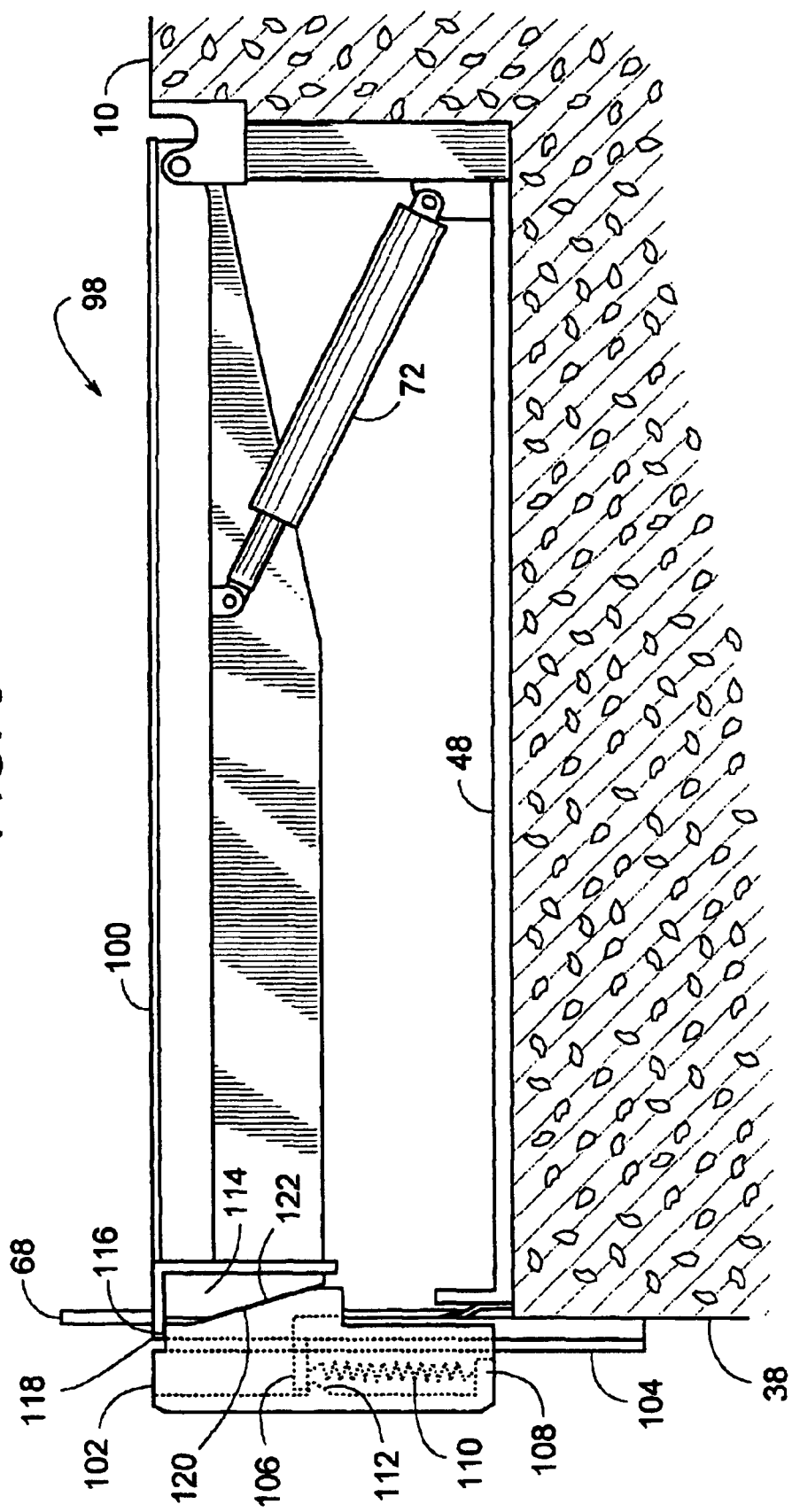
FIG. 9 is a side view of another embodiment of a dock leveler system with its deck in a cross-traffic position and its bumper in an operative position.

Spring 110 returns bumper 102 to its operative position when deck 100 pivots upward from its below-dock position of FIG. 12 to its cross-traffic position of FIG. 9. Since stop 112 limits the upward movement of bumper 102, block 114 separates from bumper 102 when cylinder 72 lifts deck 100 further from its cross-traffic position of FIG. 9 to a raised position of FIG. 10.

So that bumper 102 can withstand an impact from a truck that backs up against it, bumper 102 gains horizontal structural support from deck 100, which is much sturdier than bumper 102 and track 104. This is achieved by placing an angled face 120 of block 114 adjacent to a similarly angled face 122 on bumper 102. The two faces 120 and 122 are adjacent when deck 100 is in its cross-traffic position of FIG. 9. Thus, a horizontal impact from a truck is transmitted through bumper 102, block 114, deck 100, and onto frame 48 and the surrounding concrete of the dock. Although the two faces 120 and 122 are angled to allow deck 100 to pivot without the two faces 120 and 122 binding against each other, the angle is preferably at a minimum to avoid raising the deck due to the impact of the truck. Also, when deck 100 is in its cross-traffic position of FIG. 9, the two faces 120 and 122 are preferably about 0.13 inches apart to ensure that spring 110 can raise bumper 102 without excessive frictional resistance between the two faces 120 and 122. However, the spacing between the two faces 120 and 122 should preferably not be so great that bumper 102 or track 104 would need to yield plastically before making contact between the two faces. The actual use of dock leveler 98 is similar to that of dock leveler 14 with regards to loading and unloading a truck, operating the deck, and operating lip 32; however, operator 44, extension 96 and plate 94 are not required.

Figure 14:
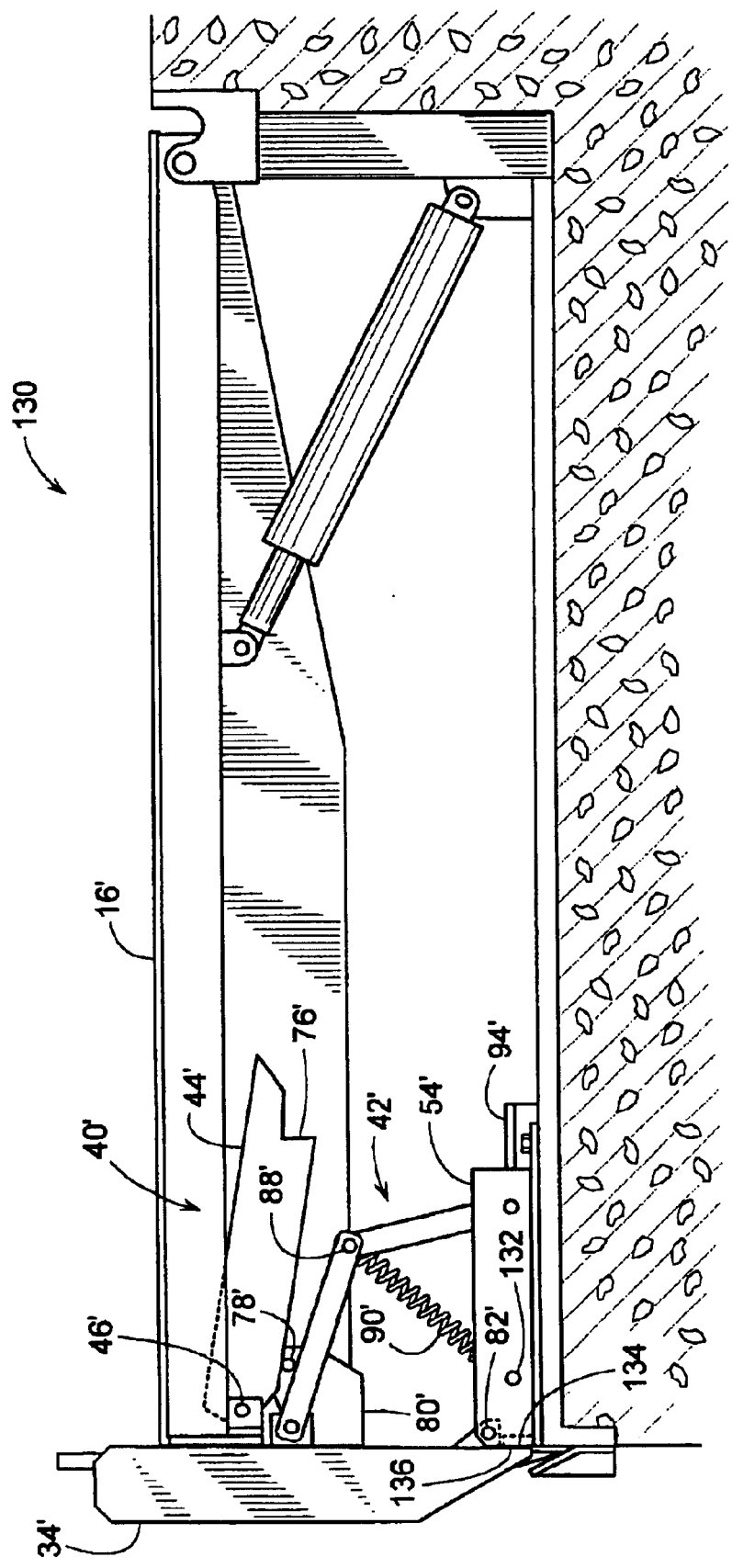
FIG. 14 is similar to FIG. 1, but of another embodiment.
Figure 15:
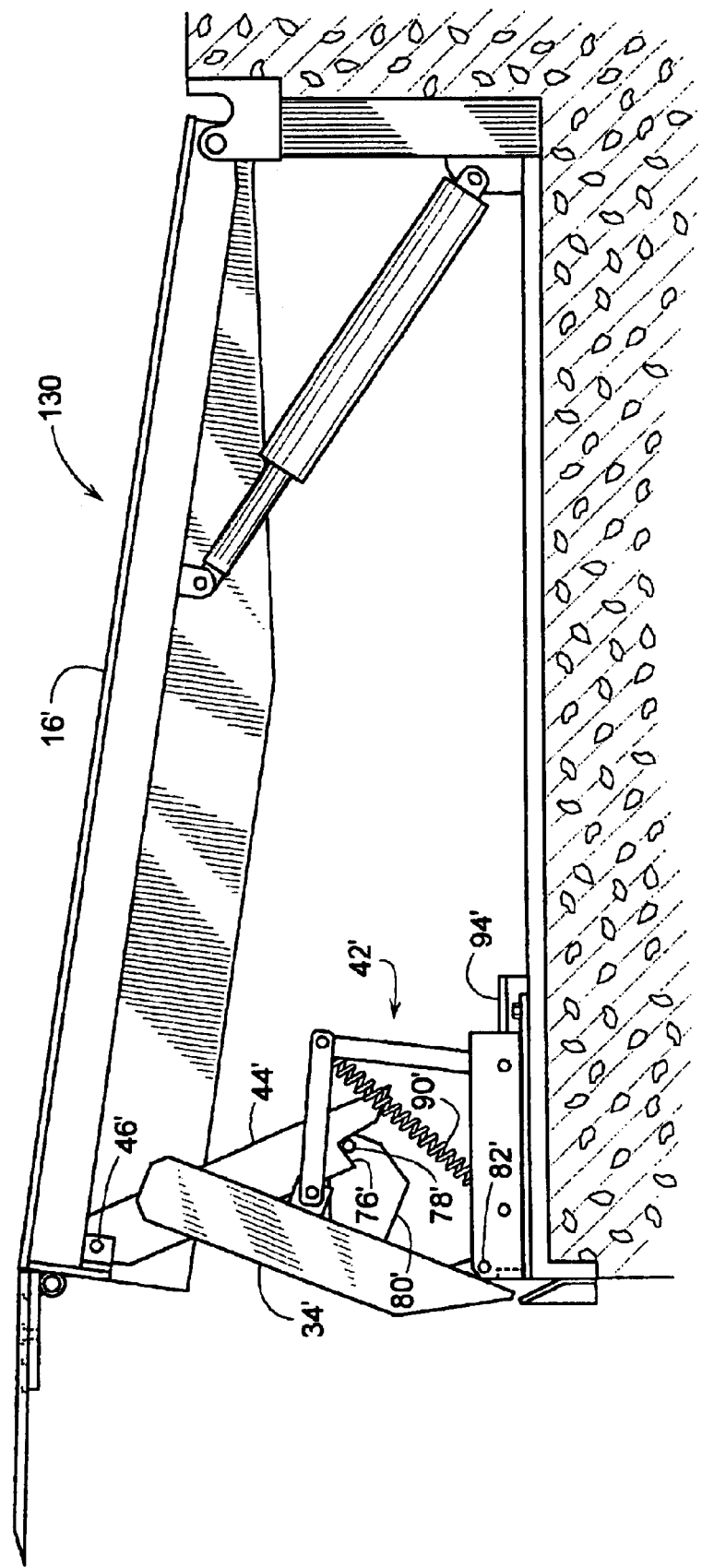
FIG. 15 is similar to FIGS. 6 and 7, but of the embodiment of FIG. 14.
Figure 16:
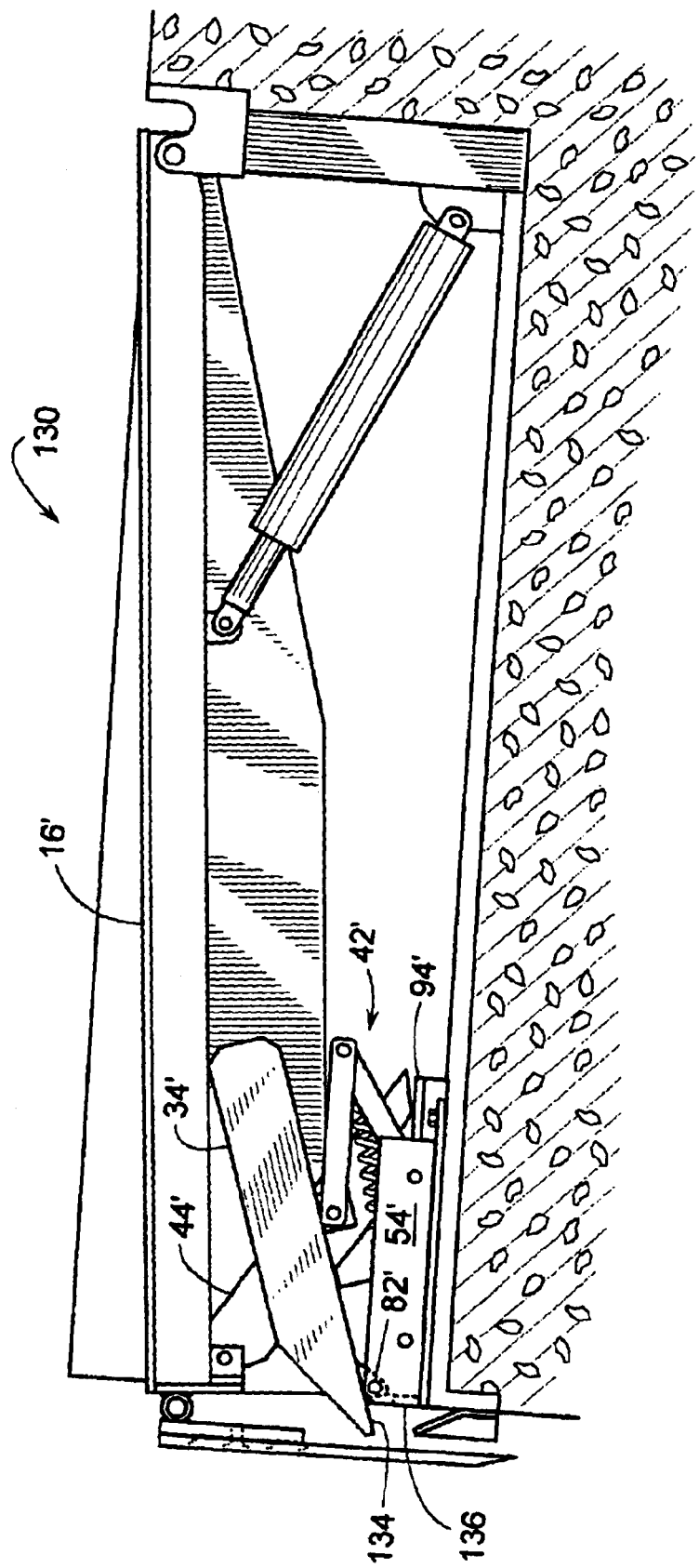
FIG. 16 is similar to FIG. 8, but of the embodiment of FIG. 14.

In another embodiment, similar to dock leveler system 14 and shown in FIGS. 14–16, a dock leveler 130 includes a bumper 34' that protrudes above deck 16' to help prevent truck beds from overriding deck 16" (i.e., the bottom of the truck bed being higher than deck 16'). A truck bed overriding a dock leveler deck can occur in applications where a low dock height designed for low trailer beds has to also receive trailers of standard bed height. To ensure that bumper 34' does not create an obstruction to material handling equipment traveling on deck 16', leveler system 130 includes a mechanism 40' that allows bumper 34' to tuck underneath deck 16'.

To enable the movement of deck 16' to move bumper 3' from its operative position of FIG. 14 to its retracted position of FIG. 16, mechanism 40' includes a four-bar linkage 42' and an operator 44', which function in a manner similar to that of four-bar linkage 42 and operator 44. More specifically, after the truck has backed against bumper 34', deck 16' is raised and the dock leveler lip is extended to allow a notch 76' in operator 44' to engage a protrusion 78' that is attached to bumper 34' by way of a lug plate 80'. Operator 44' includes an extension similar in function and structure to that of extension 96 of FIG. 1. However, the extension is not shown in FIGS. 14–16 to avoid cluttering the drawing figures with details that are already shown and readily understood with reference to the drawing figures of dock leveler system 14. With notch 76' of operator 44' engaging protrusion 78', subsequent downward movement of deck 16' forces four-bar linkage 42' to collapse from its configuration of FIG. 15 to that of FIG. 16. In doing so, bumper 34' pivots about pin 82" to its retracted position of FIG. 16, and a tension spring 90' (which extends between pins 132 and 88') stretches, which urges bumper 34' back toward its operative position in a manner similar to that of spring 90 of dock leveler 14. A plate 94' (similar to plate 94) forces operator 44' to disengage from protrusion 78'. Returning leveler 130 from it bumper-retracted position of FIG. 16 to its bumper-operative position of FIG. 14 can be done by first raising and then lowering deck 16', in a manner similar to that described of leveler system 14.

Bumper 34' could be modified to protrude even further above deck 16' than what is shown in FIG. 14 and still have sufficient clearance to tuck underneath deck 16' by simply increasing the effective length of operator 44' (i.e., increasing the distance between notch 76' and a pin 46'). The actual structure of bumper 34' and mechanism 40' can vary; however, in a preferred embodiment, bumper 34' is made of square steel tubing that is reinforced with an internal gusset and beveled and capped at each end. To provide bumper 34' with a positive stop at its operative position, as shown in FIG. 14, a lower edge 134 of bumper 34' abuts a fixed end plate 136 on a base 54' of four-bar linkage 42'.

Figure 17:
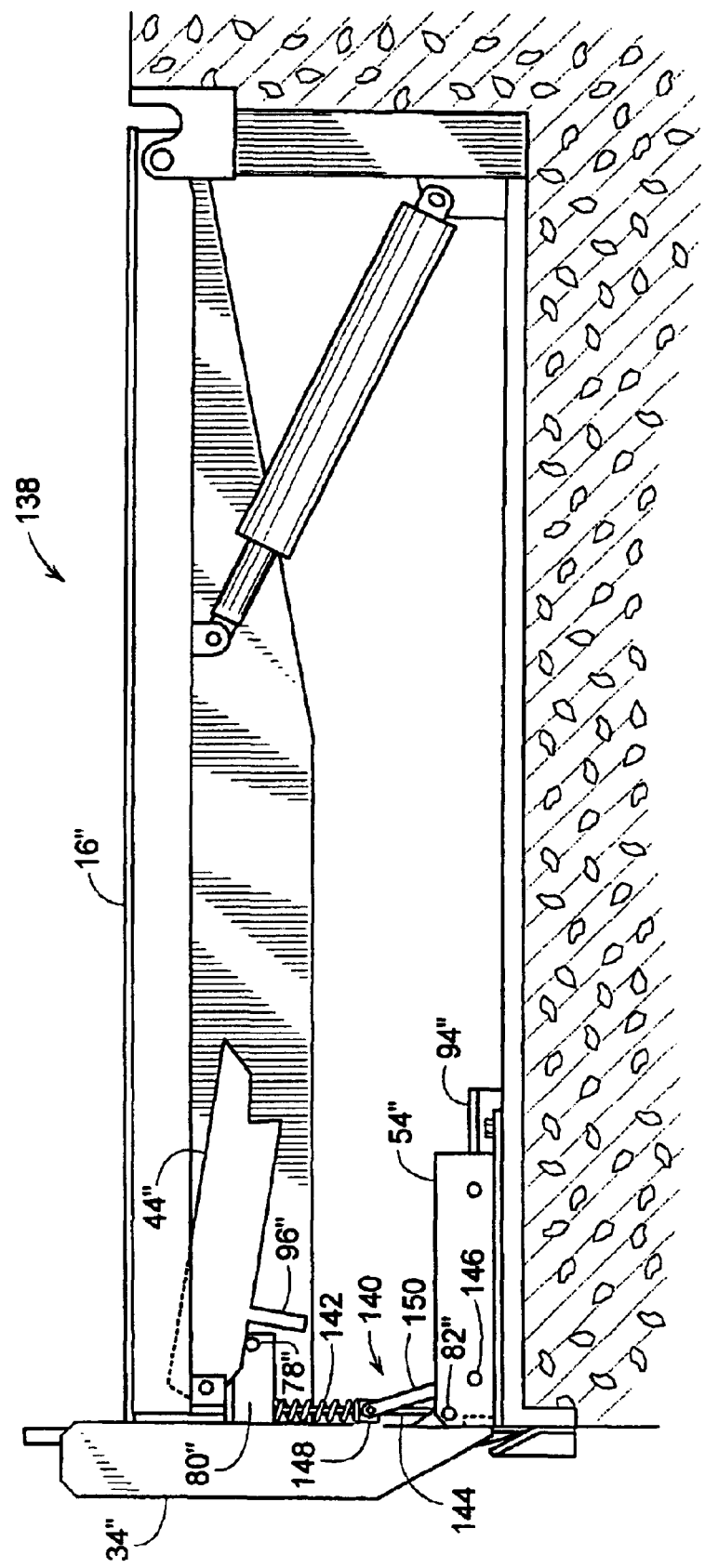
FIG. 17 is similar to FIG. 1, but of yet another embodiment.
Figure 18:
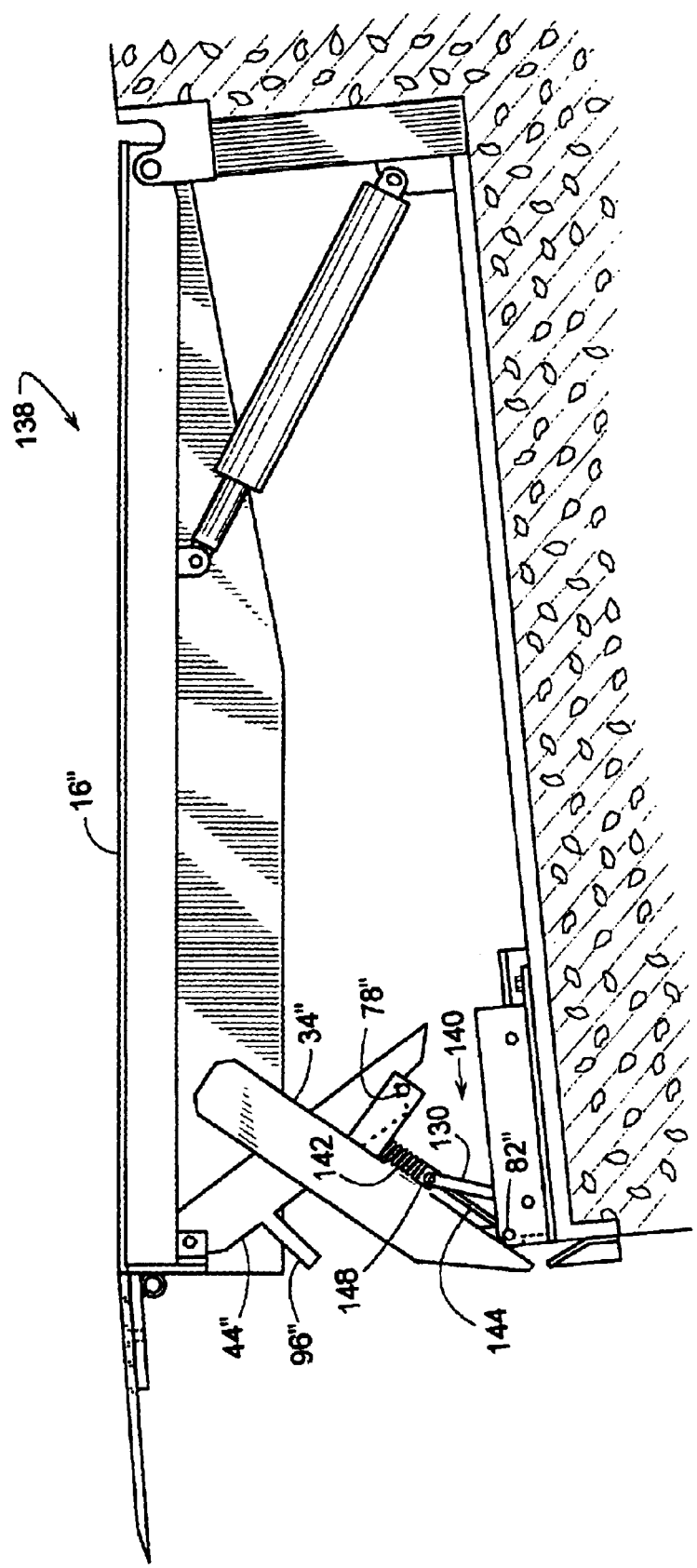
FIG. 18 is similar to FIGS. 6 and 7, but of the embodiment of FIG. 17.

In yet another embodiment, shown in FIGS. 17 and 18, a dock leveler system 138 includes a mechanism 140 that can replace four-bar linkage 42 of dock leveler 14 or replace four-bar linkage 42' of leveler 130. With regards to structure and function, an operator 44", extension 96" a protrusion 78", a bumper 34", a base 54", and a plate 94" of dock leveler 138 are closely related respectively to operator 44, extension 96, protrusion 78, bumper 34, base 54 and plate 94 of dock lever 14. However, instead of tension spring 90, mechanism 140 includes a compression spring 142 that urges bumper 34" to its operative position of FIG. 17. To accomplish the spring return of bumper 34", a guide rod 144 runs through the center of spring 142 and extends between a pin 82" in base 54" and a lug 80" (which connects protrusion 78" to bumper 34"). A block 148 slides on rod 144, and a link 150 is pivotally connected to a pin 146 on base 54" and a pin on block 148. In operation, deck 16" descending from its position of FIG. 18 forces operator 44" to push against protrusion 78", which pivots bumper 34" downward about pin 82". As bumper 44" pivots, link 150 forcibly slides block 148 along rod 144 to compress spring 142, which facilitates the return of bumper 34" to its operative position.

Although the invention is described with reference to a preferred embodiment, it should be appreciated by those skilled in the art that various modifications are well within the scope of the invention. For example, the lip extension in any of the embodiments could move linearly between extended and stored positions, as opposed to pivoting between extended and pendant positions. Although the use of two bumpers per dock leveler system is preferred, it is possible to use just one. The bumpers can be made of a variety of materials including, but not limited to steels, polymers, and various combinations thereof. Moreover, the bumpers can be shock absorbing, or they can be relatively solid and unyielding, whereby, in the later case, the dock leveler is structured to absorb the impact of the truck. Therefore, the scope of the invention is to be determined by reference to the claims that follow.

We claim:

1. A bumper assembly for a dock leveler system having a deck that can pivot, at least, between a cross-traffic position and a below-dock position, the bumper assembly comprising:
   a biasing mechanism adapted to provide an upward force;
   a bumper coupled to the biasing mechanism and disposed for substantially vertical movement between the below-dock position against the upward force under a downward moving force of the deck and the cross-traffic position when said downward moving force is removed; and
   an engagement surface carried by the bumper and being adapted to be selectively engaged by the deck to move the bumper between the cross-traffic position and the below-dock position.

2. The bumper assembly of claim 1, further comprising a track mounted independent of the deck, wherein the bumper is coupled to the track for substantial vertical movement along the track.

3. The bumper assembly of claim 2, wherein the track is mounted to the dock face between the dock face and the bumper.

4. The bumper assembly of claim 1, wherein the deck of the dock leveler system includes an upper lip that engages the engagement surface of the bumper to impart the downward force.

5. The bumper assembly of claim 4, wherein the upper lip is disposed on an angled block depending from the deck of the dock leveler system.

6. The bumper assembly of claim 5, wherein the bumper further comprises an angled face disposed adjacent the engagement surface and disposed to transfer a horizontal impact to the angled block on the deck.

7. The bumper assembly of claim 1, wherein the biasing member is a tension spring.

8. The bumper assembly of claim 1, wherein the biasing member is a compression spring.

9. The bumper assembly of claim 1, wherein the biasing member is a gas spring.

10. The bumper assembly of claim 1, wherein the biasing member includes a counterweight.

11. The bumper assembly of claim 1, wherein the bumper is operative in the below-dock position.

* * * * *